United States Patent [19]

Bennitt

[11] Patent Number: 4,852,608

[45] Date of Patent: Aug. 1, 1989

[54] FLUID CONTROL VALVE

[75] Inventor: Robert A. Bennitt, Painted Post, N.Y.

[73] Assignee: Dresser-Rand Company, Corning, N.Y.

[21] Appl. No.: 253,000

[22] Filed: Oct. 4, 1988

[51] Int. Cl.[4] ............................................. F16K 15/12
[52] U.S. Cl. ............................ 137/516.13; 137/516.11; 137/529
[58] Field of Search ...................... 137/516.11, 516.13, 137/516.25, 516.17, 516.19, 529

[56] References Cited

U.S. PATENT DOCUMENTS

| | | | |
|---|---|---|---|
| 1,081,803 | 12/1913 | Alley et al. | 137/516.13 |
| 1,324,137 | 12/1919 | Wikander | 137/516.13 |
| 2,703,583 | 3/1955 | Seligman | 137/529 |
| 2,833,305 | 5/1958 | Muckley et al. | 137/516.13 |
| 3,130,748 | 4/1964 | Weingartner | 137/529 X |
| 3,327,731 | 6/1967 | Kehler | 137/516.13 |
| 3,862,751 | 1/1975 | Schwaller | 137/529 X |
| 3,875,962 | 4/1975 | Bauer et al. | 137/529 X |

FOREIGN PATENT DOCUMENTS 1500061  5/1969  Fed. Rep. of Germany ................ 137/516.15

Primary Examiner—John Rivell
Attorney, Agent, or Firm—B. J. Murphy

[57] ABSTRACT

The valve, depicted as of the plate-type, has a ported valve seat, stop plate, and valving element (movable between the plate and seat) biased toward the seat by compression springs. Eight sets of compression springs are employed, in the disclosed embodiment, and each set comprises a pair of helical, counterwound (compression) springs concentrically nested together.

7 Claims, 2 Drawing Sheets

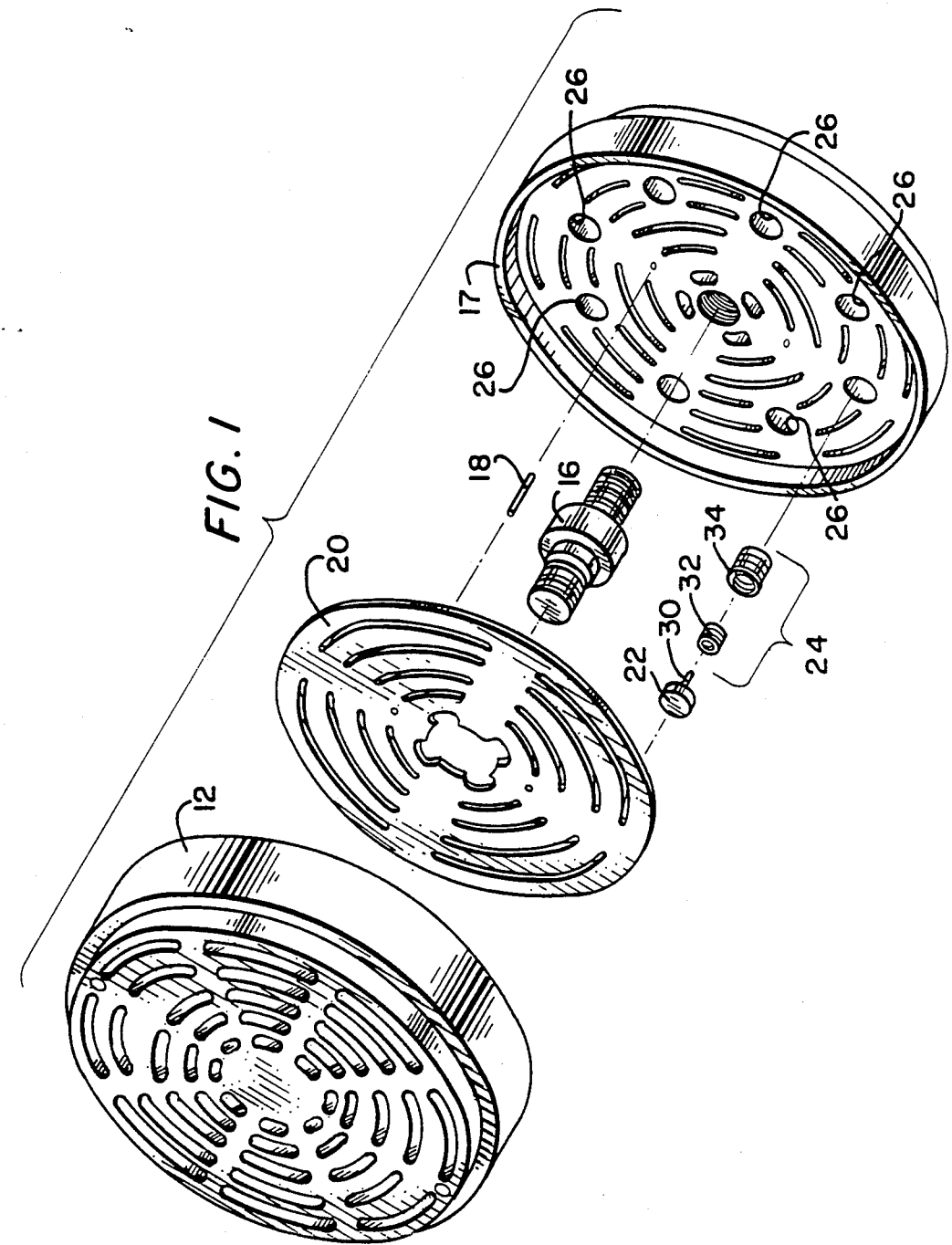

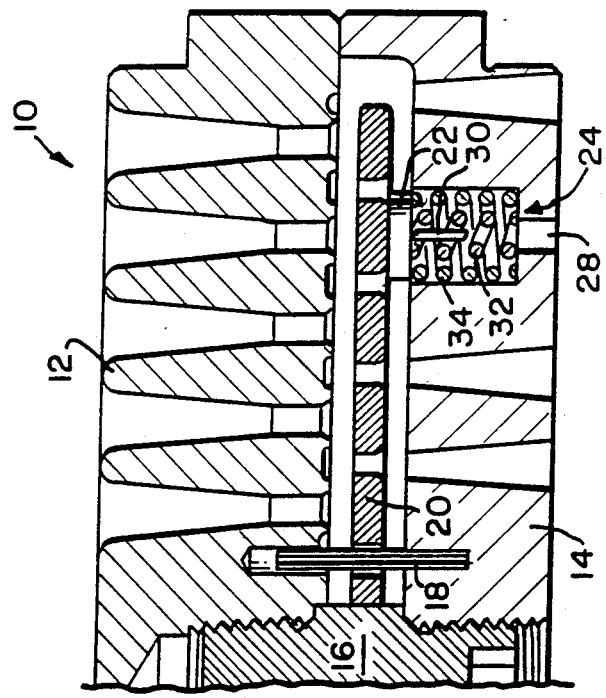
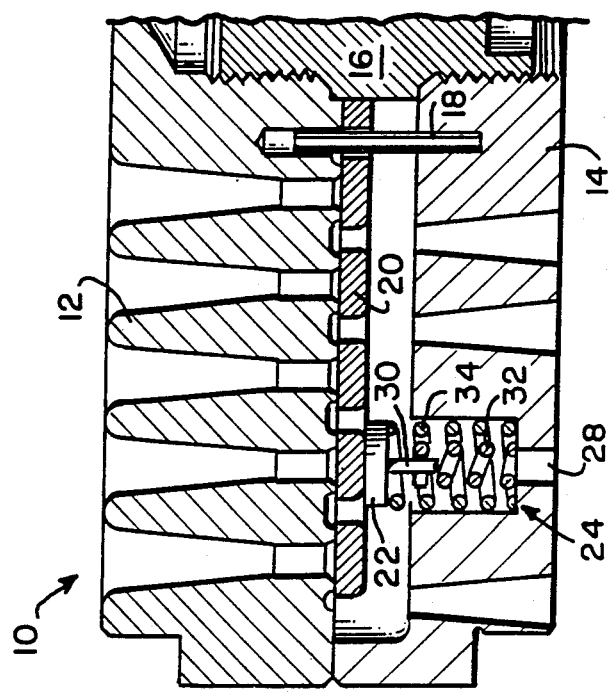

FLUID CONTROL VALVE

This invention pertains to fluid-control valves, which commonly have biasing means for urging a movable valving element in a given direction, and in particular to such a valve having a novel, valving-element biasing means.

Fluid-control valves known in the prior art typically have a ported valve seat spaced apart from a ported stop plate, a ported valving element movable therebetween—to open and close the valve—and springs engaged with the element, and reacting from the plate, urging the element toward the seat in closure of the valve.

The springs, of course, are susceptible to high mortality and failure, and the valving element also, commonly exhibited by fracture. It has not been possible to find springs which will provide a light load on the element for easy opening and yet safely decelerate the element in its travel toward the stop plate, to inhibit severe impact thereon and, yet, efficiently accelerate the element toward the valve seat before there is complete reversal of pressure or aspiration.

It is an object of this invention, then, to set forth a fluid-control valve with novel, valving-element biasing means which offers the aforenoted, desirable performance. Particularly, it is an object of this invention to disclose a fluid-control valve, comprising first means defining a ported, valve seat having a valving-element-receiving surface; second means defining a ported, stop plate having a valving-element-receiving surface, spaced apart from said seat to define a space between said surfaces; a ported, valving element, disposed in said space, movable onto, and between, said surfaces; and biasing means, interposed between said element and one of said first and second means for (a) urging said element toward one of said first and second means, and (b) for decelerating said element in its movement toward the other of said first and second means; wherein said biasing means comprises separate and distinct, albeit co-acting, compression springs.

Further objects of this invention, as well as the novel features thereof, will become more apparent by reference to the following description taken in conjunction with the accompanying figures, in which:

FIG. 1 is an exploded, perspective view of an embodiment of the novel valve;

FIG. 2A is a cross-sectional view through a half of the valve of FIG. 1, showing the valve closed; and FIG. 2B is a view like that of FIG. 2A, albeit of the other half of the valve, and showing the latter partially opened.

As shown in the figures, the novel fluid-control valve 14 comprises a ported, valve seat 12, a ported, stop plate 14, a central, threaded post 16 and alignment pins 18, a ported valving element 20, and buffer discs or buttons 22. In this embodiment, although not all are depicted, there are eight buttons 22. The buttons 22 are interposed between the valving element 20 and a like number, eight, of spring sets 24.

The stop plate 14 has eight recesses 26 formed therein, each having a circular base, and the sets 24 are nested in these recesses to bear against the bases. The bases each have a channel 28 formed fully therethrough to serve as fluid conduits. The buttons 22 have narrow, projecting stems 30 which keep the buttons 22 centralized atop the spring sets 24.

The buttons 22 are provided to isolate the element 20 from the spring sets 24 in order that the element 20 will not be unduly scored or otherwise damaged by the sets 24. It is far more economical to replace the simple inexpensive buttons 22, when worn, than an element 20 (of more complex, expensively-derived configuration).

Now, the spring sets 24, it will be appreciated, are something novel to this art. Each comprises a pair of counterwound, concentrically nested together, compression springs 32 and 34. The springs are counterwound, as noted, to effectively and mutually cancel out the torsional gouging of the buttons 22 which a single, compression spring would cause. Each spring 32 is of one outside diameter, and each spring 34 is of a greater, outside diameter, of course, to accommodate for the nesting of the former in the latter. Each has a discrete spring rate or resiliency and, as can be readily seen, is of a discrete gage of material.

Different spring options are possible with this inventive concept. That is, as desired in given circumstances, spring 32 can be stiffer, less resilient than spring 34, to prevent the element 20 from making hard impacts on the plate 14. Or, both springs could be of same or like spring rates. They could be of common, free lengths, or (as shown in FIG. 2A) spring 34 can have a greater, free length than spring 32.

In that spring 32 shares the inertia visited upon spring 34 by the element 20, each spring will exhibit a longer useful life. The relative stiffness of spring 32 insures that the element 20 can be greatly decelerated before it impacts the plate 14, and accelerated in the opposite direction before there is a complete reversal of fluid pressure across the valve 10. Clearly, this invention teaches how to compact a considerable biasing force in a relatively shallow stop plate 14.

While I have described my invention in connection with a specific embodiment thereof it is to be clearly understood that this is done only by way of example, and not as a limitation to the scope of my invention as set forth in the objects thereof and in the appended claims.

I claim:

1. A fluid control valve, comprising:
   first means defining a ported, valve seat having a valving-element-receiving surface;
   second means defining a ported, stop plate, having a valving-element-receiving surface, spaced apart from said seat to define a space between said surfaces;
   a ported, valving element, disposed in said space, movable onto, and between, said surfaces; and
   biasing means, interposed between said element and one of said first and second means for (a) urging said element toward one of said first and second means, and (b) for decelerating said element in its movement toward the other of said first and second means; wherein
   said biasing means comprise pairs of separate and distinct, albeit co-acting, compression springs; and
   said compression springs of said pairs thereof are concentrically nested together and counter-wound; and further including
   buffer means, interposed between said element and said biasing means, for isolating said element from contact with said biasing means; wherein
   said buffer means comprises single, imperforate buttons for each of, and surmounting, said pairs; and each button has a single stem projecting perpendicularly and centrally therefrom, each of said stems being circumscribed by said springs of its respective pair and comprising means for centralizing its respective button.

2. A fluid-control valve, according to claim 1, wherein: said stop plate has a recess, formed therein, which has a circular base at the innermost end thereof; and said springs are set in said recess and upon said base.

3. A fluid-control valve, according to claim 5, wherein:
   said base has a fluid-conducting channel formed fully therethrough.

4. A fluid-control valve, according to claim 1, wherein:
   said springs are helically wound; and
   each of said springs is of a discrete outside diameter.

5. A fluid-control valve, according to claim 1, wherein:
   each of said springs has a discrete spring rate or resiliency.

6. A fluid-control valve, according to claim 1, wherein:
   each of said springs has a discrete, free length.

7. A fluid-control valve, according to claim 1 wherein:
   each of said springs is a helically-wound coil of material of discrete gage.

* * * * *